(12) United States Patent
Takeshita et al.

(10) Patent No.: US 10,182,483 B2
(45) Date of Patent: Jan. 15, 2019

(54) LIGHTING APPARATUS

(71) Applicant: PANASONIC INTELLECTUAL PROPERTY MANAGEMENT CO., LTD., Osaka (JP)

(72) Inventors: Hironori Takeshita, Osaka (JP); Kentaro Yamauchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/714,163

(22) Filed: Sep. 25, 2017

(65) Prior Publication Data

US 2018/0098399 A1 Apr. 5, 2018

(30) Foreign Application Priority Data

Oct. 3, 2016 (JP) .................................. 2016-195660

(51) Int. Cl.
*F21S 8/00* (2006.01)
*H05B 33/08* (2006.01)
(Continued)

(52) U.S. Cl.
CPC .......... *H05B 33/0857* (2013.01); *F21S 8/024* (2013.01); *F21S 8/026* (2013.01); *F21V 7/0008* (2013.01); *F21V 13/12* (2013.01); *G02B 6/0025* (2013.01); *G02B 6/0031* (2013.01); *F21S 8/033* (2013.01); *F21S 8/04* (2013.01); *F21Y 2113/00* (2013.01); *F21Y 2113/13* (2016.08); *F21Y 2115/10* (2016.08); *F21Y 2115/15* (2016.08); *F21Y 2115/20* (2016.08); *F21Y 2115/30* (2016.08)

(58) Field of Classification Search
CPC ........ F21S 8/024; F21S 8/026; G02B 6/0025; G02B 6/0031; H05B 33/0857
USPC ..................................................... 362/249.01
See application file for complete search history.

(56) References Cited

U.S. PATENT DOCUMENTS 5,664,862 A * 9/1997 Redmond .............. G02B 6/001
362/293
9,448,340 B2 * 9/2016 Griffin ................. G02B 5/0236
(Continued)

FOREIGN PATENT DOCUMENTS

JP 09-146093 6/1997
JP 2007-317659 12/2007
(Continued)

*Primary Examiner* — Seung H Lee
(74) *Attorney, Agent, or Firm* — Greenblum & Bernstein, P.L.C.

(57) ABSTRACT

A lighting apparatus includes: a white light source; a blue light source; a reflector layer which reflects light; a light diffuser layer which is light transmissive and disposed on an anterior surface side of the reflector layer; and a scatter panel which is light transmissive and disposed on an anterior surface side of the light diffuser layer to face the light diffuser layer. At least a portion of a gap between the scatter panel and the reflector layer and at least a portion of a gap between the scatter panel and the light diffuser layer change from a first end side to a second end side of the lighting apparatus. The white light source and the blue light source are disposed on the first end side of the lighting apparatus to emit light toward the light diffuser layer and the scatter panel.

20 Claims, 9 Drawing Sheets

(51) Int. Cl.
*F21S 8/02* (2006.01)
*F21V 8/00* (2006.01)
*F21V 7/00* (2006.01)
*F21V 13/12* (2006.01)
*F21S 8/04* (2006.01)
*F21Y 113/00* (2016.01)
*F21Y 115/30* (2016.01)
*F21Y 115/10* (2016.01)
*F21Y 115/20* (2016.01)
*F21Y 115/15* (2016.01)
*F21Y 113/13* (2016.01)

(56) References Cited

U.S. PATENT DOCUMENTS 9,835,301 B2 * 12/2017 Sorensen ............ F21S 8/083
9,857,519 B2 * 1/2018 Shani ............... G02B 6/0031
2007/0274096 A1 11/2007 Chew et al.
2008/0204888 A1 * 8/2008 Kan ................. F21S 8/026
  359/629
2011/0051036 A1 3/2011 Yamashita et al.
2015/0378083 A1 12/2015 Takakusaki
2017/0363800 A1 * 12/2017 Liu ................. G02B 6/0081

FOREIGN PATENT DOCUMENTS

| | | |
|---|---|---|
| JP | 2007-329007 | 12/2007 |
| JP | 2009-081089 | 4/2009 |
| JP | 2010-211010 | 9/2010 |
| JP | 2011-053309 | 3/2011 |
| JP | 2011-054312 | 3/2011 |
| JP | 2012-221553 | 11/2012 |
| JP | 2015-191686 | 11/2015 |
| JP | 2016-012540 | 1/2016 |

* cited by examiner

LIGHTING APPARATUS

CROSS REFERENCE TO RELATED APPLICATION

This application claims the benefit of priority of Japanese Patent Application Number 2016-195660 filed on Oct. 3, 2016, the entire content of which is hereby incorporated by reference.

BACKGROUND

1. Technical Field

The present disclosure relates to a lighting apparatus capable of emitting light imitating the sky in nature, and performing illumination rendering for providing a sense of infinite depth as if viewing the distant sky.

2. Description of the Related Art

Conventionally, a planar lighting apparatus which includes a light source for emitting white light, a reflection sheet for reflecting light, and a light guide plate has been disclosed (see, for example, Japanese Unexamined Patent Application Publication No. 2016-12540).

The above-described planar lighting apparatus is capable of suppressing color unevenness occurring on the light guide plate and uniforming color tones of emission light.

SUMMARY

However, when the above-described lighting apparatus is installed on a wall, a ceiling, or the like in facilities, it is difficult to reproduce a blue sky by the lighting apparatus, because a color temperature or a luminance level is uniform. In addition, it is conceivable that a display of a television set, for example, is installed in facilities for reproducing a blue sky. However, with a video display device such as a display, a position of the surface of a light emitter is easily and precisely recognized physically, due to granularity of image elements or the like, and thus it is difficult to reproduce a sky that is recognizes as the sky in nature.

Furthermore, even if a blue sky is reproduced by the lighting apparatus, structures in the neighborhood might be reflected on a reflector layer, which makes it difficult for the reproduced blue sky to be recognized as the sky in nature.

In view of the above, an object of the present disclosure is to provide a lighting apparatus capable of reproducing an artificial sky with a simple configuration.

In order to achieve the above-described object, a lighting apparatus according to an aspect of the present disclosure includes: a light source; a reflector layer which reflects light; a light diffuser layer which is light transmissive and disposed on an anterior surface side of the reflector layer; and a scatter panel which is light transmissive and disposed on an anterior surface side of the light diffuser layer to face the light diffuser layer, wherein at least a portion of a gap between the scatter panel and the reflector layer and at least a portion of a gap between the scatter panel and the light diffuser layer change from a first end side to a second end side of the lighting apparatus, the light source is disposed on the first end side of the lighting apparatus to emit light toward the light diffuser layer and the scatter panel.

According to the present disclosure, it is possible to reproduce an artificial sky with a simple configuration.

BRIEF DESCRIPTION OF DRAWINGS

The figures depict one or more implementations in accordance with the present teaching, by way of examples only, not by way of limitations. In the figures, like reference numerals refer to the same or similar elements.

Figure 1:
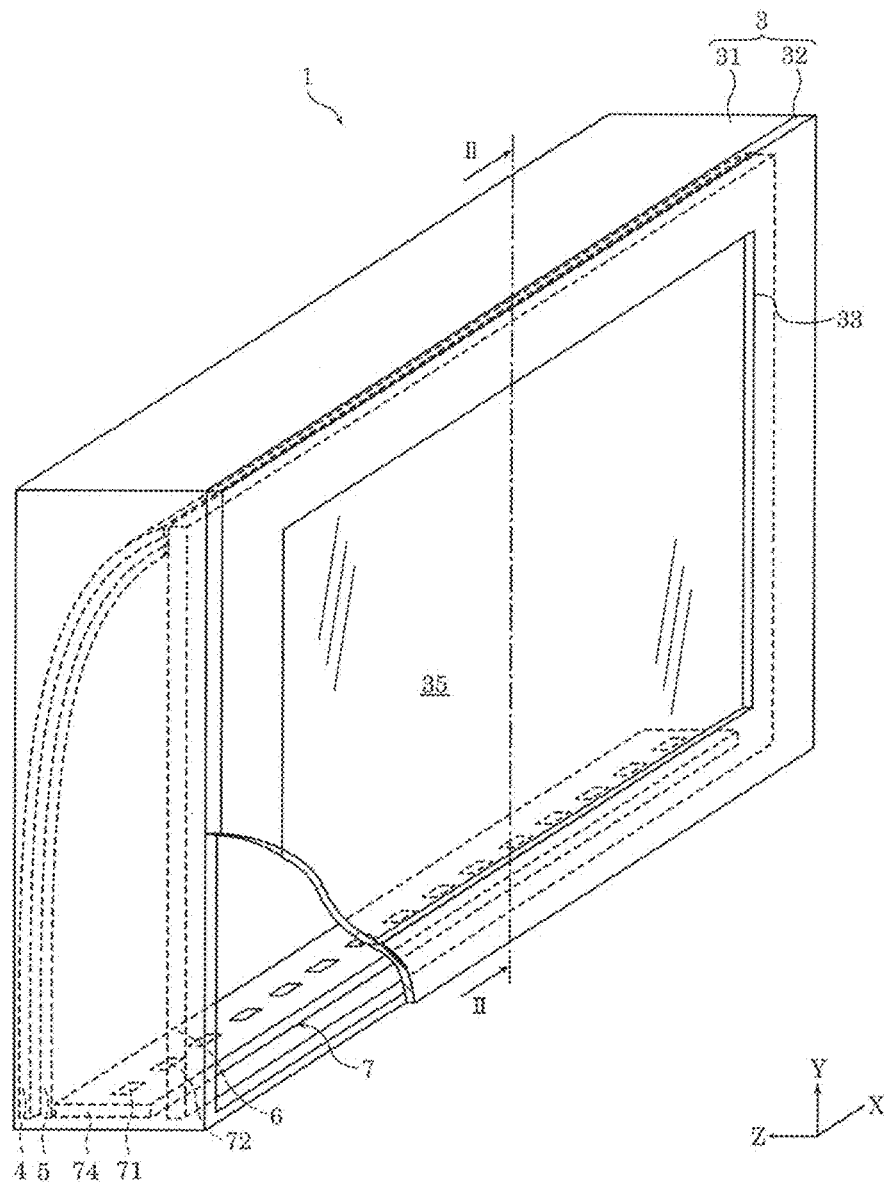
FIG. 1 is a perspective view which illustrates the lighting apparatus according to Embodiment 1.

DETAILED DESCRIPTION OF THE EMBODIMENTS (Underlying Knowledge Forming the Basis of the Present Disclosure)

When viewing a blue sky through a window from the inside of a room, the viewer feels a sense of infinite depth present behind the window. In addition, a blue sky is not uniform but consecutively changes gradationally in a color temperature or a luminance level. Furthermore, light entering through a window changes in the color temperature with passage of time during the day and according to the weather. For that reason, when a lighting environment is provided using a lighting apparatus, how to provide a lighting environment which is more similar to the lighting environment in nature matters.

When a generally-used lighting apparatus is used for setting a lighting environment similar to the lighting environment in nature, the lighting apparatus emits uniform light with luminance unevenness and color unevenness being suppressed, and it is difficult to feel a sense of depth as if viewing an actual sky. Accordingly, a cooped-up feeling is still sensed even when the generally-used lighting apparatus is installed on a ceiling, a wall, or the like.

In facilities or the like where it is difficult to obtain natural light from the architectural point of view, it is possible, for example, to provide a user with a sense of openness or to make a user feel relaxed with the sense of openness, by setting a lighting environment similar to the lighting environment in nature. In addition, bright light contributes to a better external appearance, and thus there is demand for aggressively introducing light into the facilities, for example.

In view of the above, it is conceivable that a display of a television set, or the like, is installed in facilities for reproducing a blue sky. However, with the display or the like, a physical position of a video display surface is easily and precisely recognized, and it is difficult to reproduce light entering through a window, making it difficult to feel the display or the like as if an actual window. In addition, with restriction on a weight, it may be difficult to install the display or the like on a wall or a ceiling in facilities, and thus it is conceivable that construction costs for the installation are increased.

Furthermore, even if a blue sky is reproduced by the lighting apparatus, structures in the neighborhood might be reflected on a reflector layer, which makes it difficult for the reproduced blue sky to be recognized as the sky in nature.

In view of the above, there is demand for providing a lighting environment which provides a feeling as if a window is present in a place where a window cannot be normally installed. In other words, a bright and relaxing openness is created, for example, by installing a lighting apparatus which provides a natural lighting environment and a sense of infinite depth as if viewing a blue sky through a window. In addition, in terms of costs, there is also demand for suppressing an increase in costs for installation.

In view of the above, an object of the present disclosure is to provide a lighting apparatus capable of reproducing an artificial sky with a simple configuration.

Hereinafter, embodiments of the present disclosure will be described with reference to the drawings. It should be noted that the subsequently-described embodiments each show a specific example of the present disclosure. Therefore, numerical values, shapes, materials, structural components, the arrangement and connection of the structural components, etc. shown in the following embodiments are mere examples, and are not intended to limit the scope of the present disclosure. Furthermore, among the structural components in the following exemplary embodiment, components not recited in the independent claim which indicates the broadest concept of the present disclosure are described as arbitrary structural components.

Moreover, "substantially" and "approximately" mean, for example in the case of "substantially the same", not only exactly the same, but what would be recognized as essentially the same as well.

In addition, each of the diagrams is a schematic diagram and thus is not necessarily strictly illustrated. In each of the diagrams, substantially the same structural components are assigned with the same reference signs, and redundant descriptions will be omitted or simplified.

The following describes a lighting apparatus according to Embodiment 1 of the present disclosure.

(Configuration)

First, a configuration of lighting apparatus 1 according to the present embodiment shall be described with reference to FIG. 1.

Figure 2:
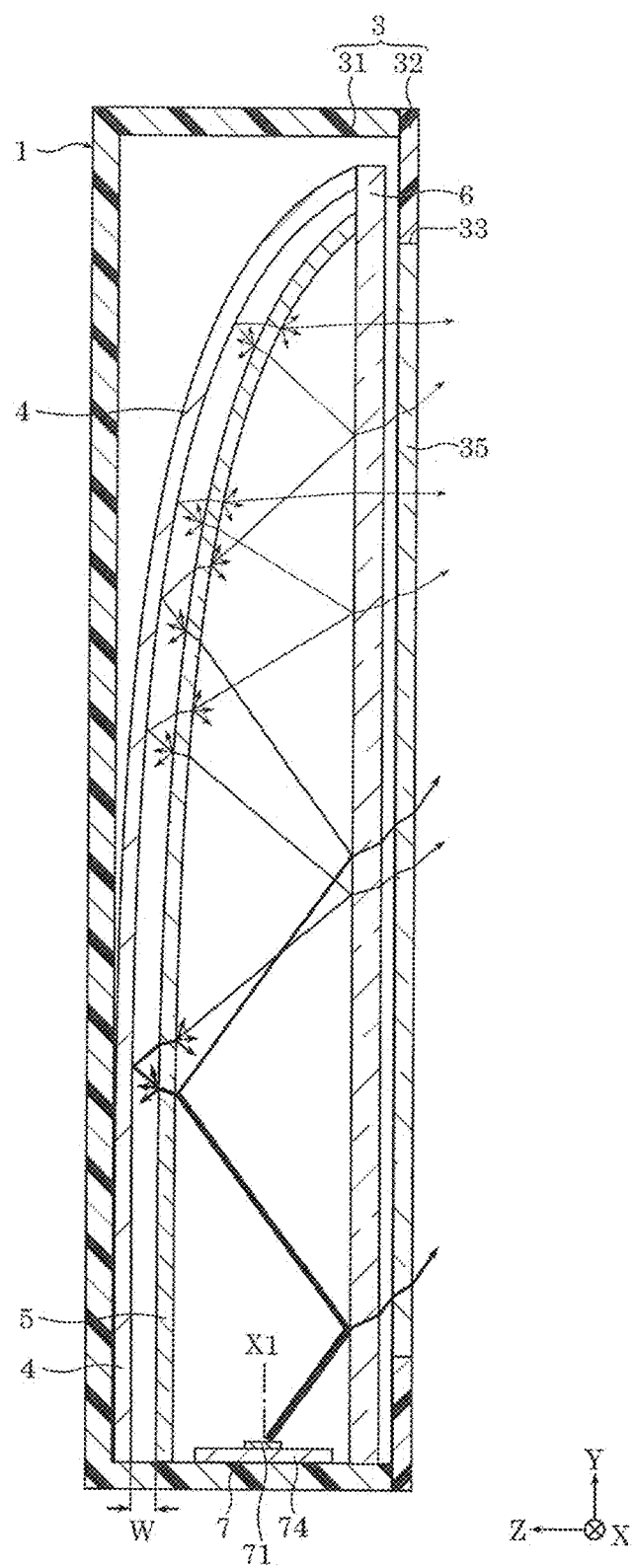
FIG. 2 is a cross-sectional view which illustrates the lighting apparatus along the line II-II of FIG. 1, according to Embodiment 1.
Figure 3:
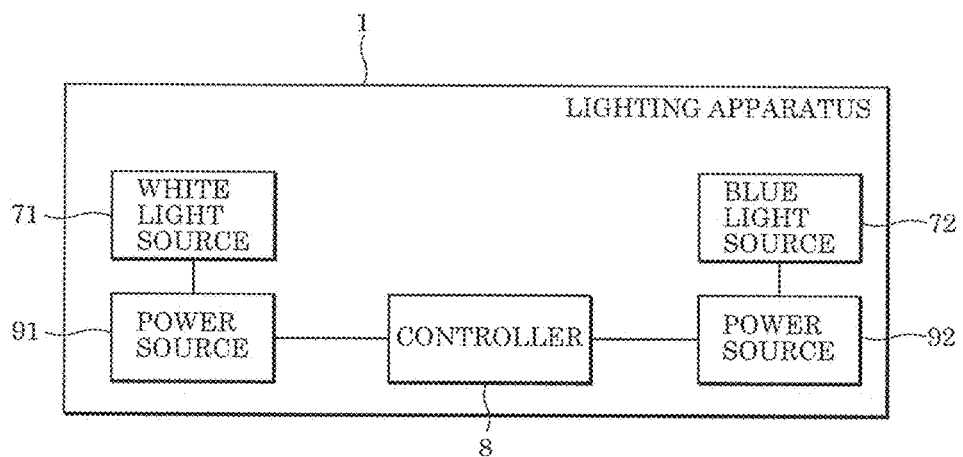
FIG. 3 is a block diagram which illustrates the lighting apparatus according to Embodiment 1.
Figure 4:
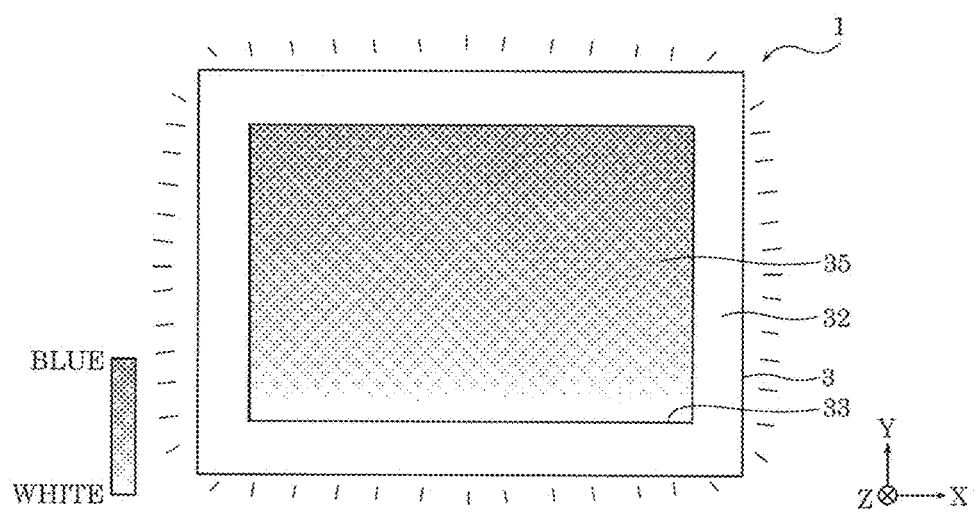
FIG. 4 is an image diagram which illustrates light distribution of the lighting apparatus according to Embodiment 1.

FIG. 1 is a perspective diagram which illustrates lighting apparatus a according to Embodiment 1. FIG. 2 is a cross-sectional view which illustrates lighting apparatus 1 along the line II-II of FIG. 1, according to Embodiment 1. FIG. 3 is a block diagram which illustrates lighting apparatus 1 according to Embodiment 1. FIG. 4 is an image diagram which illustrates light distribution of lighting apparatus 1 a according to Embodiment 1. It should be noted that, although white light source 71 is illustrated in FIG. 2, which one of white light source 71 and blue light source 72 is viewed differs according to the position of the cross-section surface.

FIG. 1 illustrates lighting apparatus 1 in which directions are defined as follows: the direction in which white light source 71 (an example of the light source) and blue light source 72 (an example of the light source) are aligned is an X-axis direction; the direction parallel to optical axis X1 of each of white light source 71 and blue light source 72 is a Y-axis direction; and an up and down direction is a Z-axis direction. According to the present embodiment, an X-axis plus direction is the right direction, an X-axis minus direction is the left direction, a Y-axis plus direction is the front direction, a Y-axis minus direction is the back direction, a Z-axis plus direction is the up direction, and a Z-axis minus direction is the down direction. It should be noted that the directions illustrated in FIG. 2 and subsequent figures correspond to those illustrated in FIG. 1, it should also be noted that the up and down directions, right and left directions, and front and back directions illustrated in FIG. 1 may change depending on how the lighting apparatus is used, and as such, are non-limiting examples. The same applies to all subsequent figures.

Lighting apparatus 1 is a device which emits light imitating the sky in nature, and performs illumination rendering for providing a sense of infinite depth as if viewing the distant sky. Lighting apparatus 1 is, for example, a lighting apparatus that is installed on a ceiling, a wall, or the like in a facility, and in particular, may be installed in a facility (location) where natural lighting is difficult to obtain. As illustrated in FIG. 1 to FIG. 3, lighting apparatus 1 includes casing 3, reflector layer 4, light diffuser layer 5, scatter panel 6, light emitting module 7, controller 8, and two power sources 91 and 92.

Casing 3 is a thin box having a rectangular shape elongated in the right and left direction. Casing 3 houses reflector layer 4, light diffuser layer 5, scatter panel 6, light emitting module 7, controller 8, and two power sources 91 and 92. The shape of casing 3 according to the present embodiment is not specifically limited, and may be not only the rectangular shape elongated in the right and left direction but also a circular shape, a multiangular shape, a semicircle shape, and so on.

Casing 3 includes main body 31 and frame body 32.

Main body 31 is a thin box with a bottom, and has a lower side that is fully open. Main body 31 houses reflector layer 4, light diffuser layer 5, scatter panel 6, light emitting module 7, and two power sources 91 and 92.

Frame body 32 is, for example, a flat component having a rectangular shape in an anterior view. Frame body 32 has opening portion 33 having a rectangular shape, in a center portion. Opening portion 33 corresponds to an inner portion of frame body 32. Frame body 32 is disposed on a lower side of main body 31 which is open, so as to cover a portion of the lower side of main body 31. In other words, frame body 32 is disposed to overlap an outer periphery side of light diffuser layer 5 in an anterior view. Opening portion 33 of frame body 32 is provided with light transmissive plate 35 to cover opening portion 33. In addition, frame body 32 may be designed imitating a window frame so as to provide sensation as if light is entering through a window. It should be noted that the shape of frame body 32 is not specifically limited, and may be not only the rectangular shape but also a circular shape, a multiangular shape, a semicircle shape, and so on.

Light transmissive plate 35 is light transmissive, and, for example, a flat component having a rectangular shape in an anterior view. Light transmissive plate 35 is fixed to frame body 32 to cover opening portion 33 of frame body 32. Light transmissive plate 35 is formed using a light transmissive resin material such as acrylic and polycarbonate, or a light transmissive material such as a transparent glass material. It should be noted that the shape of frame body 32 is not specifically limited, and may be not only the rectangular shape but also a circular shape, a multiangular shape, a semicircle shape, and so on. In addition, light transmissive plate 35 need not be provided to opening portion 33, and is not an indispensable structural component.

Light transmissive plate 35 has at least one surface uniformly covered by an antireflection film or an antireflection material for preventing reflection of light. According to lighting apparatus 1, the antireflection film or the antireflection material covers the rear surface of light transmissive plate 35 so as to make it difficult for light to be reflected.

The antireflection material or the antireflection film according to the present embodiment can be formed as a coating film, for example, through nanopatterning or the like. However, the present disclosure is not limited to this example. In addition, various types of antireflection materials and antireflection films may be used, and the antireflection material or the antireflection film may be formed using a technique known in the art.

Reflector layer 4 is a mirror which has a curved plate-like shape and reflects incident light, and is disposed close to a base side (upper side) of main body 31. Reflector layer 4 is housed by main body 31 in such a manner that an anterior surface (lower surface) that is a mirror faces the lower side. Reflector layer 4 is curved from a first end side (back side) to a second end side (front side) of reflector layer 4 so as to have an arc-like shape in a cross-section view. In other words, reflector layer 4 defines a portion of a substantially cylindrical shape.

At least a portion of a gap between light diffuser layer 5 and scatter panel 6 varies from a first end side to a second end side of scatter panel 6. More specifically, the gap gradually narrows from the first end side to the second end side of reflector layer 4 in such a manner that reflector layer 4 approaches to a front side portion of scatter panel 6. According to the present embodiment, an edge on the second end side (front edge) of reflector layer 4 on the opposite side of light emitting module 7 is in contact with scatter panel 6. However, the edge on the second end side of reflector layer 4 may be spaced apart from scatter panel 6. It should be noted that, reflector layer 4 defines a portion of a substantially cylindrical shape according to the present embodiment. However, the present disclosure is not limited to this example, and reflector layer 4 may be flat. Here, the first end side of scatter panel 6 is an example of a first end side of lighting apparatus 1, and the second end side of scatter panel 6 is an example of a second end side of lighting apparatus 1.

Reflector layer 4 reflects light emitted by white light source 71 and blue light source 72 which will be described later and directly incident on reflector layer 4. Reflector layer 4 also reflects light emitted by white light source 71 and blue light source 72, incident on light diffuser layer 5, and is diffused. It should be noted that reflector layer 4 only need to reflect incident light, and may be, for example, a plate which is black in color. In addition, a cross-section surface of reflector layer 4 is not limited to the arc-like shape, and may be a portion of a paraboloidal surface or the like. It should be noted that the shape of reflector layer 4 is not specifically limited, and may be not only the rectangular shape but also a circular shape, a multiangular shape, a semicircle shape, and so on.

Reflector layer 4 may have a wavelength-selective property of absorbing red light and reflecting blue light. In this case, reflector layer 4 is implemented by applying, to the surface of reflector layer 4, a light diffusion reflection sheet having a property of diffusely reflecting light. Here, red light is light having a wavelength in a range from at least 610 nm to at most 750 nm, and not strictly meaning red, but meaning light generally recognized as red. In addition, here, blue light is light having a wavelength in a range from at least 435 nm to at most 495 nm and not strictly meaning blue, but meaning light generally recognized as blue.

Reflector layer 4 may diffusely reflect less than or equal to 50% of incident light (i.e., of all of reflected light). It should be noted that reflector layer 4 may have functions of specular reflection and diffuse reflection which are partially combined. In addition, of all of reflected light that is reflected by reflector layer 4, the percentage of light diffusely reflected may be only small, and the percentage of light diffusely reflected may be 0%. Here, diffuse reflection means to reflect incident light in various directions when light is incident on reflector layer 4 at a certain incident angle, and also referred to as irregular reflection. Furthermore, when light is incident on reflector layer 4 at a certain incident angle, specular reflection, here, means to reflect the light at an angle substantially equal to the incident; angle of the light, in a direction that depends on the incident angle of the light.

According to the present embodiment, a wavelength absorbing layer which absorbs light of a predetermined wavelength, and absorbs light of a wavelength different from the predetermined wavelength may be provided to an element other than reflector layer 4. For example, such a wavelength absorbing layer may be provided to cover light emitting module 7, or may be provided to light diffuser layer 5.

It should be noted that reflector layer 4 may have a property that reflects light intensively forward (in a desired direction) irrespective of an incident angle of the light. This can be achieved by, for example, providing an uneven shape to the surface of reflector layer 4.

Reflector layer 4 is implemented by, for example, mirror finishing applied, through mirror coating or polishing, a fine optical structure, an isotropic material, etc. In addition, reflector layer 4 may be, for example, a mirror including metal such as aluminum or silver vapor that is deposited on a component such as resin, rubber, or metal.

Light diffuser layer 5 is a light transmissive component which diffuses incident light, and is disposed in main body 31. Light diffuser layer 5 has a curved plate-like shape and has a thickness approximately in a range from 0.5 mm to several millimeters. Light diffuser layer 5 has substantially the same size as reflector layer 4. Light diffuser layer 5 is disposed between reflector layer 4 and optical axis X1 of each of white light source 71 and blue light source 72. According to the present embodiment, light diffuser layer 5 is disposed to face the anterior surface side (lower surface side) of reflector layer 4, in a state in which light diffuser layer 5 is spaced apart from the anterior surface of reflector layer 4 by approximately 0 mm to several tens of millimeters (gap W).

Light diffuser layer 5 is curved so as to have an arc-like shape in a cross-section view, in the same manner as reflector layer 4. More specifically, the gap gradually narrows from the first end side (back side) to the second end side (front side) of light diffuser layer 5 in such a manner that light diffuser layer 5 approaches to scatter panel 6 disposed downwardly with respect to light diffuser layer 5. Light diffuser layer 5 is provided in casing 3 in such a manner that light diffuser layer 5 is adjacent to and spaced apart from reflector layer 4. Light diffuser layer 5 has an edge on the second end side (front edge) on the opposite side of light emitting module 7, and the edge on the second end side is in contact with scatter panel 6. It should be noted that, light diffuser layer 5 defines a portion of a substantially cylindrical shape according to the present embodiment. However, the present disclosure is not limited to this example, and light diffuser layer 5 may be flat. In addition, a cross-section surface of light diffuser layer 5 is not limited to the arc-like shape, and may be a portion of a paraboloidal surface or the like. It should be noted that the shape of light diffuser layer 5 is not specifically limited, and may be not only the rectangular shape but also a circular shape, a multiangular shape, a semicircle shape, and so on.

It should be noted that, although light diffuser layer 5 is spaced apart from reflector layer 4 according to the present embodiment, light diffuser layer 5 may be disposed in such a manner, for example, that light diffuser layer 5 is laminated on the anterior surface of reflector layer 4. According to the present embodiment, the gap between reflector layer 4 and light diffuser layer 5 is denoted as W.

Light diffuser layer 5 is formed using a light transmissive resin material such as acrylic and polycarbonate, or a light transmissive material such as a transparent glass material. Light diffuser layer 5 may be, for example, a layer resulting from applying sandblasting on the anterior surface of reflector layer 4, a prism sheet on which microstructure unevenness is defined, a layer formed of a transparent component having light diffusion properties such as metal oxide, a layer made of a transparent component including a number of bubbles, etc. In addition, light diffuser layer 5 may be a layer including resin, white pigment, or the like which contains a light diffuse material such as silica, calcium carbonate, titanium oxide, or the like, and is dispersed on a base material of light diffuser layer 5, and may be a layer including a lacteous light diffuse film as a result of selectively applying resin, white pigment, or the like which contains a light diffuse material on the anterior surface (lower surface) and a rear surface (upper surface) of light diffuser layer 5. It should be noted that diffusion caused by light diffuser layer 5 is diffusion not depending on a wavelength of light but depending on an incident position, an incident angle, etc., of light.

Scatter panel 6 is a component having a rectangular shape in an anterior view, and is disposed downwardly with respect to reflector layer 4 and light diffuser layer 5 in main body 31 to face light diffuser layer 5. Scatter panel 6 is disposed to be substantially parallel to a horizontal direction. According to the present embodiment, scatter panel 6 has an edge on the front side in contact with an edge on the front side of on light diffuser layer 5. However, the edge on the front side of scatter panel 6 may be spaced apart from the edge on the front side of light diffuser layer 5.

Scatter panel 6 has a lower surface (anterior surface) through which transmitted light exits scatter panel 6. The lower surface of scatter panel 6 faces light transmissive plate 35. In addition, scatter panel 6 has an upper surface (rear surface) which is opposite to the anterior surface, and the rear surface is a surface on which light is mainly incident. The upper surface of scatter panel 6 is disposed on the anterior surface side of light diffuser layer 5, and faces light diffuser layer 5.

Scatter panel 6 has a light scattering function for scattering light. It should be noted that, as one example of scatter panel 6, a Rayleigh scattering plate which causes Rayleigh scattering of incident light may be employed. The Rayleigh scatter panel is a component which includes resin such as light transmissive acrylic as a base material, and a nanocomposite material dispersed therein. The nanocomposite material is oxidized metal such as titanium oxide, zinc oxide, zirconia oxide, etc. When a particle size of the nanocomposite material is sufficiently smaller than a wavelength of light, Rayleigh scattering of light which is incident on scatter panel 6 occurs. It should be noted that scattering caused by scatter panel 6 is scattering which depends on a wavelength of light.

It should be noted that a haze of scatter panel 6 may be in a range from approximately 5% to approximately 30%. Here, the haze indicates an amount defined by (diffuse transmittance/total transmittance)×100. The diffuse transmittance indicates a ratio of an amount of exit light having an output angle greater than or equal to a predetermined output angle (within 5 degrees of an angle of parallel light, for example) among light exits scatter panel 6, to the total amount of incident light when parallel light is incident on scatter panel 6. Since the diffuse transmittance of light is high when the haze of scatter panel 6 exceeds 30%, the sense of perspective is not created by lighting apparatus 1.

Light emitting module 7 emits light of different luminescent colors. More specifically, light emitting module 7 is a module which includes a plurality of white light sources 71 (an example of the light source), a plurality of blue light sources 72 (an example of the light source), and circuit board 74 on which the plurality of white light sources 71 and the plurality of blue light sources 72 are mounted. Light emitting module 7 has a plate-like shape which is elongated in the right and left directions, and is disposed between light diffuser layer 5 and scatter panel 6 on the first end side of light diffuser layer 5 and scatter panel 6. In other words, light emitting module 7 is disposed in such a manner that optical axis X of the light source is sandwiched between light diffuser layer 5 and scatter panel G. It should be noted that, in the present embodiment, the light source refers to the plurality of white light sources 71 and the plurality of blue light sources 72.

The plurality of white light sources 71 and the plurality of blue light sources 72 are, as they are called, surface mount device (SMD) light emitting diode (LED) elements. Specifically, the SMD LED element is an LED element of a package-type formed by mounting an LED chip (light-emitting element) in a cavity molded by resin, and disposing a phosphor-containing resin in the cavity. The plurality of white light sources 71 and the plurality of blue light sources 72 are turned on, dimmed, and turned off under the control of controller 8 disposed in lighting apparatus 1. In addition, the plurality of white light sources 71 and the plurality of blue light sources 72 receive dimming control and toning control as a result of controller 8 separately or simultaneously controlling, by adjusting the amount of power supply, the two power sources 91 and 92. According to the present embodiment, dimming (brightness) and toning (a luminescent color of emitted light) of light emitting module 7 may be controlled.

It should be noted that the plurality of white light sources 71 and the plurality of blue light sources 72 are not limited to the above-described configuration, and a chip on board (COB) module including an LED chip directly mounted on circuit board 74 may be used. In addition, the light-emitting element included by the plurality of white light sources 71 and the plurality of blue light sources 72 is not limited to an LED, and may be, for example, a semiconductor light-emitting element such as a semiconductor laser, or a solid-state light-emitting element such as an organic electro luminescence (EL) or an inorganic EL.

The plurality of white light sources 71 and the plurality of blue light sources 72 may be disposed at substantially regular intervals along the length (the right and left directions) of circuit board 74. The order of arrangement of white light sources 71 and blue light sources 72, and the number of lines may be changed as appropriate.

Optical axis X1 of each of the plurality of white light sources 71 and optical axis X1 of each of the plurality of blue light sources 72 extend in the front direction between light diffuser layer 5 and scatter panel 6. In other words, the plurality of white light sources 71 and the plurality of blue light sources 72 are disposed on the first end side of scatter panel 6 to emit light toward reflector layer 4, light diffuser layer 5, and scatter panel 6. Although optical axis of each of the plurality of white light sources 71 and optical axis X1 of each of the plurality of blue light sources 72 intersect with reflector layer 4 and light diffuser layer 5 according to the present embodiment, optical axis X1 of each of the plurality of white light sources 71 and optical axis X1 of each of the plurality of blue light sources 72 may intersect with scatter panel 6. According to the present embodiment, light emitting module 7 is disposed on main body 31 in such a manner that optical axis X1 of each of the plurality of white light sources 71 and optical axis X1 of each of the plurality of blue light sources 72 are substantially parallel with scatter panel 6.

Controller 8 controls operations of light emitting module 7, such as turning on, turning off, dimming (adjustment of brightness), and toning (adjustment of a luminescent color of emitted light (color temperature)), according to an instruction issued by a user (a control signal transmitted via a remote controller or, the like). In other words, controller 8 controls light emission mode of white light source 71 and blue light source 72 via power sources 91 and 92. Controller 8 includes a circuit, etc., for controlling light emitting module 7 and the like. Controller 8 implements the above-described operations by a microcomputer, processor, etc., or a dedicated circuit, which control a value of a current supplied to light emitting module 7 according to an input signal.

The two power sources 91 and 92 each include a power supply circuit which generates power for causing light, emitting module 7 to emit light. The two power sources 91 and 92 each rectify, smooth, step down, etc., power supplied from a power system, for example, to convert the power into DC power at a predetermined level, and supplies the DC power to light emitting module 7. The two power sources 91 and 92 are electrically connected to the power system via power lines such as control lines.

Power source 91 which is one of the two power sources 91 and 92 supplies power to each of white light sources 71, and power source 92 which is the other of the two power sources 91 and 92 supplies power to each of blue light sources 72. The two power sources 91 and 92 switch on and off power supply to light emitting module 7, as a result of being controlled by a control circuit. For example, when lighting apparatus 1 receives an operation for turning on via an operation component such as a remote controller, the control circuit causes the two power sources 91 and 92 to supply power to light emitting module 7 to turn on white light sources 71 and blue light sources 72. When lighting apparatus 1 receives an operation for turning off via the operation component, the control circuit causes the two power sources 91 and 92 to stop supplying power to light emitting module 7 to turn off white light sources 71 and blue light sources 72.

According to lighting apparatus 1 as described above, for example, light emitted from white light source 71 and blue light source 72 is partially reflected by the rear surface of scatter panel 6 and travels to light diffuser layer 5, and is partially scattered when passing through scatter panel 6 and exits scatter panel 6. The light incident on the anterior surface of light diffuser layer 5 is partially reflected and travels to scatter panel 6, and is partially diffused when passing through light diffuser layer 5 and enters reflector layer 4. Of the light incident on reflector layer 4 which has a wavelength-selective property, a portion having a low color temperature, such as red light, is absorbed by reflector layer 4, and a portion having a high color temperature, such as blue light, is diffusely reflected by reflector layer 4. In addition, the light reflected by reflector layer 4 is incident on the rear surface of light diffuser layer 5, and partially is diffused when passing through light diffuser layer 5 and exits light diffuser layer 5 from the anterior surface of light diffuser layer 5, or partially is reflected by the rear surface of light diffuser layer 5 and further reflected by reflector layer 4. The light exiting light diffuser layer 5 from the anterior surface of light, diffuser layer 5 is incident on the rear surface of scatter panel 6. Then the incident light is partially reflected by scatter panel 6, and partially is passes through scatter panel 6.

As described above, the light emitted by white light source 71 and blue light source 72 is repeatedly reflected and diffused by reflector layer 4, light diffuser layer 5, and scatter panel 6. Accordingly, as illustrated in FIG. 4, light having a high luminance level is emitted from the back side of scatter panel 6 (a portion close to light emitting module 7), and light having a low luminance level is emitted from the front side of scatter panel 6. More specifically, the light looks like having a gradation in which the color temperature or the luminance level of light gradually changes according to a distance from white light source 71 and, blue light source 72. In other words, the brightness of the light that exits scatter panel 6 increases with decreasing distance from white light source 71 and blue light source 72, and the brightness of the light that exits scatter panel 6 decreases with increasing distance from white light source 71 and blue light source 72. In such a manner, light which provides a sense of a color and a luminance gradient which are similar to the actual sky is emitted from scatter panel 6.

More specifically, with lighting apparatus 1 as described above, a portion of light between reflector layer 4 and light; diffuser layer 5 is diffused by light diffuser layer 5 and exits, and a portion of light is repeatedly reflected between reflector layer 4 and light diffuser layer 5. As a result, blurred light exits the anterior surface of reflector layer 4 and is emitted from lighting apparatus 1. In addition, a portion of light is repeatedly reflected between light diffuser layer 5 and scatter panel 6, and a portion of light passes through light diffuser layer 5 and is further diffused. Then, light that is scattered when passing through scatter panel 6 is emitted.

Lighting apparatus 1 described above has a configuration in which a gap between scatter panel 6 and reflector layer 4 and a gap between scatter panel 6 and light diffuser layer 5 change from the first end side to the second end side of scatter panel 6, thereby emitting light from lighting apparatus 1. When scatter panel 6, reflector layer 4, and light diffuser layer 5 are parallel with each other, light is repeatedly reflected between scatter panel 6 and reflector layer 4 and light diffuser layer 5, and thus it is difficult for the light to exit lighting apparatus 1. Accordingly, with lighting apparatus 1 described above, a gap between scatter panel 6 and reflector layer 4 and a gap between scatter panel 6 and light diffuser layer 5 are changed, thereby emitting light which looks like having a gradation in which the color temperature or the luminance level of light gradually changes according to a distance from white light source 71 and blue light source 72 and having the luminance gradient similar to the actual sky.

Advantageous Effect

Next, an advantageous effect of lighting apparatus 1 according to the present embodiment will be described.

As described above, lighting apparatus 1 according to the present embodiment includes: white light source 71; blue light source 72; reflector layer 4 which reflects light; light diffuser layer 5 which is light transmissive and disposed on the anterior surface side of reflector layer 4; and scatter panel 6 which is light transmissive and disposed on the anterior surface side of light diffuser layer 5 to face light diffuser layer 5. In addition, at least a portion of a gap between scatter panel 6 and reflector layer 4 and a gap between scatter panel 6 and light diffuser layer 5 change from a first end side to a second end side of lighting apparatus 1. White light source 71 and blue light source 72 are disposed on the first end side of lighting apparatus 1 to emit light toward light diffuser layer 5 and scatter panel 6.

According to this configuration, the brightness of the light emitted from scatter panel 6 increases with the decreasing distance from white light source 71 and blue light source 72, and the brightness of the light emitted from scatter panel 6 decreases with the increasing distance from white light source 71 and blue light source 72. Accordingly, light having luminance gradient exits scatter plate 6. For that reason, when lighting apparatus 1 is viewed, the viewer perceives, through light transmissive plate 35, luminance gradient similar to the actual sky.

In addition, the configuration is simple because light is repeatedly diffused and reflected and light having the sense of perspective can be emitted from scatter panel 6, by simply including light source 71, blue light source 72, reflector layer 4, light diffuser layer 5, and scatter panel 6.

Moreover, with lighting apparatus 1 described above, even when an image is reflected on reflector layer 4, the light of this image is, for example, diffused by light diffuser layer 5, and the light which exits light diffuser layer 5 is scattered by scatter panel 6. Accordingly, the image reflected on reflector layer 4 is difficult to visually recognize even when lighting apparatus 1 is viewed.

Thus, according to lighting apparatus 1, it is possible to reproduce an artificial sky with a simple configuration.

In particular, by disposing light diffuser layer 5 between reflector layer 4 and optical axis X1, light is repeatedly reflected and diffused between scatter panel 6 and reflector layer and between scatter panel 6 and light diffuser layer 5, and thus an image reflected on reflector layer 4 is blurred without processing for causing the inside of casing 3 to have a black color or installing of components. For that reason, with lighting apparatus 1 described above, it is possible to suppress increase in the manufacturing costs.

An image reflected on reflector layer 4 which is curved to define a portion of a cylindrical shape is more distorted than an image reflected on a flat reflector layer, and thus is viewed more unnatural. However, with lighting apparatus 1 described above, light diffuser layer 5 is disposed between reflect layer 4 and optical axis X1 of each of white light source 71 and blue light source 72. Accordingly, even when an image reflected on reflector layer 4 is distorted, the light reflected by reflector layer 4 is diffused by light diffuser layer 5, and thus it is possible to makes it difficult to visually recognize the image reflected on reflector layer 4. In other words, since it is possible to employ not only a flat reflector layer but also curved reflector layer 4, the degree of freedom of designing lighting apparatus 1 increases.

In addition, in lighting apparatus 1 according to the present embodiment, the gap between scatter panel 6 and light diffuser layer 5 and the gap between scatter panel 6 and reflector layer 4 each narrow from the first end side to the second end side of lighting apparatus 1.

When the gap between scatter panel 6 and light diffuser layer 5 and the gap between scatter panel 6 and reflector layer 4 each increase, lighting apparatus 1 increases in size. According to this configuration, the gap between scatter panel 6 and light diffuser layer 5 and the gap between scatter panel 6 and reflector layer 4 each decrease with increasing distance from white light source 71 and blue light source 72, and thus it is possible to suppress an increase in size of lighting apparatus 1.

In addition, in lighting apparatus 1 according to the present embodiment, the edge on the second end side of each of light diffuser layer 5 and reflector layer 4 opposite to white light source 71 and blue light source 72 is in contact with scatter panel 6.

According to this configuration, since the edge on the second end side of each of light diffuser layer 5 and reflector layer 4 is in contact with scatter panel 6, it is difficult to visually recognize the inside configuration even when the edge on the second end side of each of light diffuser layer 5 and reflector layer 4 is illuminated. For that reason, it is not necessary to increase the width of the frame of frame body 32, and thus the area of opening portion 33 is not likely to be small.

In addition, in lighting apparatus 1 according to the present embodiment, light diffuser layer 5 is adjacent to and spaced apart from reflector layer 4.

According to this configuration, since light diffuser layer 5 is spaced apart, from reflector layer 4, a portion of light is diffused by light diffuser layer 5 and exits, and a portion of light is repeatedly reflected between reflector layer 4 and light diffuser layer 5. As a result, blurred light exits the anterior surface of reflector layer 4 and is emitted from lighting apparatus 1. In other words, even when an image is reflected on reflector layer 4, light that is diffused by light diffuser layer 5 is emitted, and thus the image reflected on reflector layer 4 is blurred.

In addition, in lighting apparatus 1 according to the present embodiment, the light source emits light of different luminescent colors.

According to the present embodiment, the light source includes white light source 71 and blue light source 72. According to this configuration, light that exits scatter panel 6 looks like having a gradation in which the color temperature or the luminance level of light gradually changes according to a distance from white light source 71 and blue light source 72.

In addition, in lighting apparatus 1 according to the present embodiment, the light source includes white light source 71 which emits white light and blue light source 72 which emits blue light.

According to this configuration, scatter panel 6 looks like having a gradation in which the color temperature or the luminance level of light gradually changes according to a distance from white light source 71 and blue light source 72, and thus is seen as if the actual sky.

In addition, lighting apparatus 1 according to the present embodiment further includes frame body 32 which has a plate-like shape and includes opening portion 33 through which light that exits light diffuser layer 5 passes. Frame body 32 is disposed to cover an outer periphery of light diffuser layer 5 in an anterior view of opening portion 33.

According to this configuration, frame body 32 is disposed to cover an outer periphery side of scatter panel 6 in the anterior view of opening portion 33. Accordingly, it is difficult to visually recognize the wall portion of main body 31 in the vicinity of scatter panel 6 via opening portion 33.

In particular, as in the present embodiment, even when scatter panel 6 is disposed substantially horizontally, it is difficult to visually recognize the side faces on the left and right sides of main body 31 via light transmissive plate 35 of opening portion 33 in the anterior view of lighting apparatus 1. Accordingly, it is difficult to visually recognize that the gap between scatter panel 6 and light diffuser layer 5 and the gap between scatter panel 6 and reflector layer 4 each changes. For that reason, the sense of depth is maintained.

In particular, luminance unevenness and color unevenness are difficult to visually recognize even when a plurality of LED chips, white light sources 71 and color light sources 72, are arranged as in the present embodiment. For that reason, it is possible to provide an open feeling and sensation as if viewing the actual sky through light transmissive plate 35.

In addition, in lighting apparatus 1 according to the present embodiment, reflector layer 4 is a mirror which reflects incident light According to this configuration, the light which is incident on reflector layer 4 is specularly reflected and partially exits from scatter panel 6 via light diffuser layer 5, and partially is reflected by scatter panel 6 and travels toward reflector layer 4 via light diffuser layer 5. For that reason, the luminance level of light which exits scatter panel 6 decreases with increasing distance from white light source 71 and blue light source 72. Thus, it is possible for a user to feel the color and the luminance gradient which are similar to the actual sky. In other words, it is possible to provide a user with a sense of depth.

In addition, lighting apparatus 1 according to the embodiment further includes a wavelength absorbing layer which absorbs light having a predetermined wavelength.

According to this configuration, since the wavelength absorbing layer is provided to lighting apparatus 1, it is possible to absorb light of predetermined wavelength included in light emitted by white light source 71 and blue light source 72, making it easy to emit light having a wavelength other than the predetermined wavelength.

In addition, in lighting apparatus 1 according to the present embodiment, a wavelength selective layer is disposed on reflector layer 4. Reflector layer 4 may have a wavelength-selective property which absorbs light having a wavelength in a range from at least 610 nm to at most 750 nm, and reflects light having a wavelength in a range from at least 435 to at most 495.

According to this configuration, reflector layer 4 absorbs red light included in white light, and thus it is possible to prevent red light from exiting light diffuser layer 5. For that reason, it is possible to reproduce a blue sky more similar to the actual blue sky.

In addition, in lighting apparatus 1 according to the present embodiment, scatter panel 6 may be a Rayleigh scattering plate which causes Rayleigh scattering of incident light.

According to this configuration, red light included in white light is difficult to diffuse by light diffuser layer 5 and blue light is diffused by light diffuser layer 5, and thus pale blue light exits the anterior surface of light diffuser layer 5. For that reason, it is possible to reproduce an artificial blue sky by using the Rayleigh scattering plate. In particular, since the number of blue light sources 72 can be reduced in this case, it is possible to reduce the manufacturing costs.

In addition, lighting apparatus 1 according to the present, embodiment further includes casing 3 that includes frame body 32 which has a plate-like shape and includes opening portion 33 through which light that exits light diffuser layer 5 passes. In addition, the light sources are disposed on casing 3 in a state in which light is caused to enter scatter panel 6 from a side face of scatter panel 6. Scatter panel 6 has a light scattering function that scatters light which the scatter panel guides.

In addition, in lighting apparatus 1 according to the present embodiment, less than or equal to 50% of light reflected by reflector layer 4 is diffusely reflected.

In addition, in lighting apparatus 1 according to the present embodiment, a haze of scatter panel 6 is in a range from approximately 5% to approximately 30%.

Modification Examples of Embodiment 1

Figure 5:
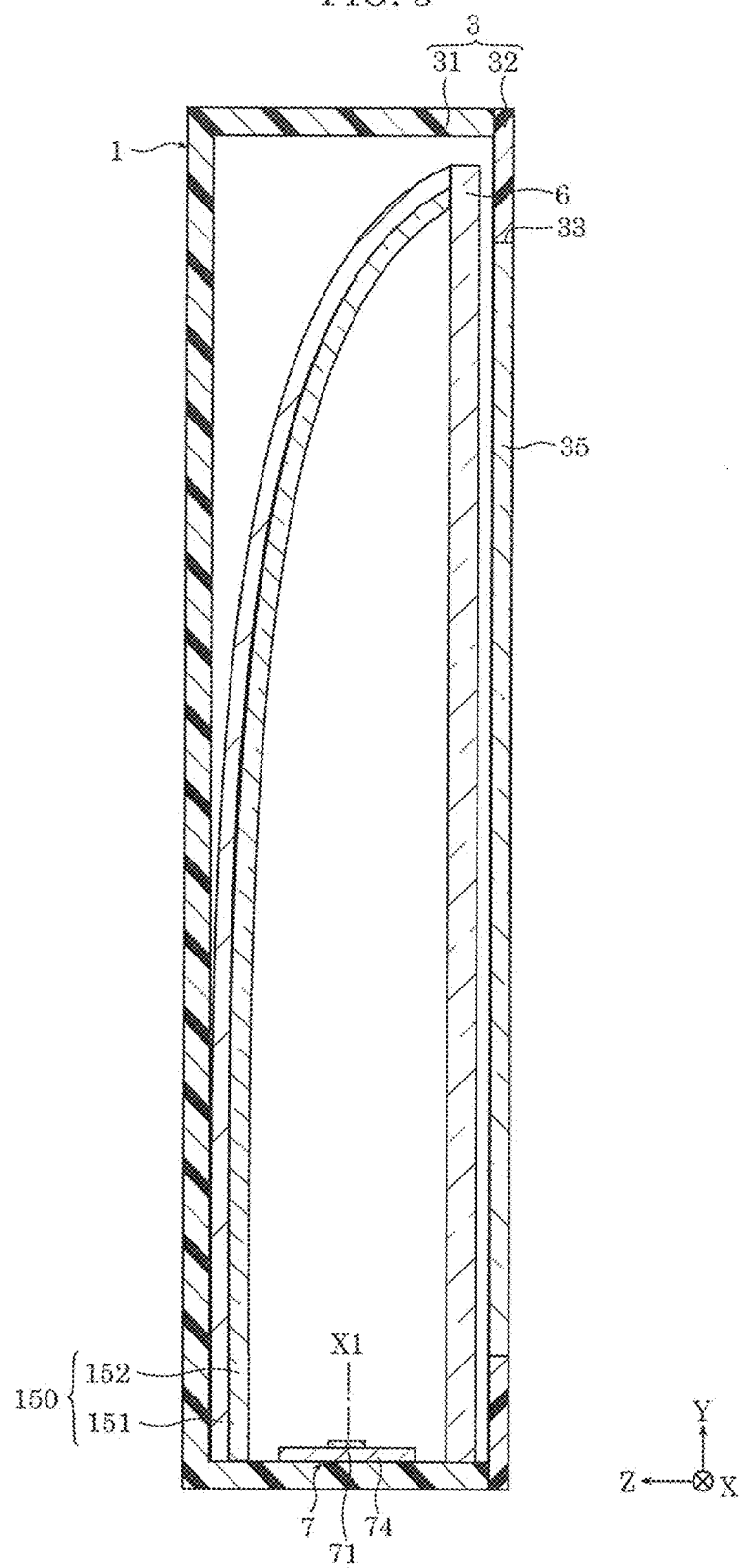
FIG. 5 is a cross-sectional diagram which illustrates the lighting apparatus according to a modification example of Embodiment 1.

The following describes lighting apparatus 1 according to a modification example, with reference to FIG. 5.

FIG. 5 is a cross-sectional diagram illustrating lighting apparatus 1 according to a modification example of Embodiment 1. It should be noted that, although white light source 71 is viewed due to the position of the cross-section surface in FIG. 5 blue light source 72 may be viewed in a different cross-section surface.

Other structural components according to this modification example are the same as those according to Embodiment 1 unless otherwise specified, and thus the same structural components are assigned with the same reference signs, and detailed descriptions for the structural components will be omitted. As illustrated in FIG. 5, diffusion reflection layer 150 includes reflector layer 151 and light diffuser layer 152.

Light diffuser layer 152 is laminated on reflector layer 151. In other words, reflector layer 151 and light diffuser layer 152 are integrally formed, and reflector layer 151 is closely attached to light diffuser layer 152. In the present modification example, light diffuser layer 152 has a similar configuration as the configuration of light diffuser layer 5 according to Embodiment 1, and reflector layer 151 has a similar configuration as the configuration of reflector layer 4 according to Embodiment 1.

In this case, it is possible to obtain advantageous effects similar to the advantageous effects of Embodiment 1, by simply including diffusion reflection layer 150 instead of reflector layer 4 and light diffuser layer 5 of Embodiment 1. Accordingly, it is not necessary to provide a component for supporting light diffuser layer 152 in a state in which light diffuser layer 152 is spaced apart from reflector layer 151, and thus it is possible to easily assemble lighting apparatus 1.

Embodiment 2

(Configuration)

Figure 6:
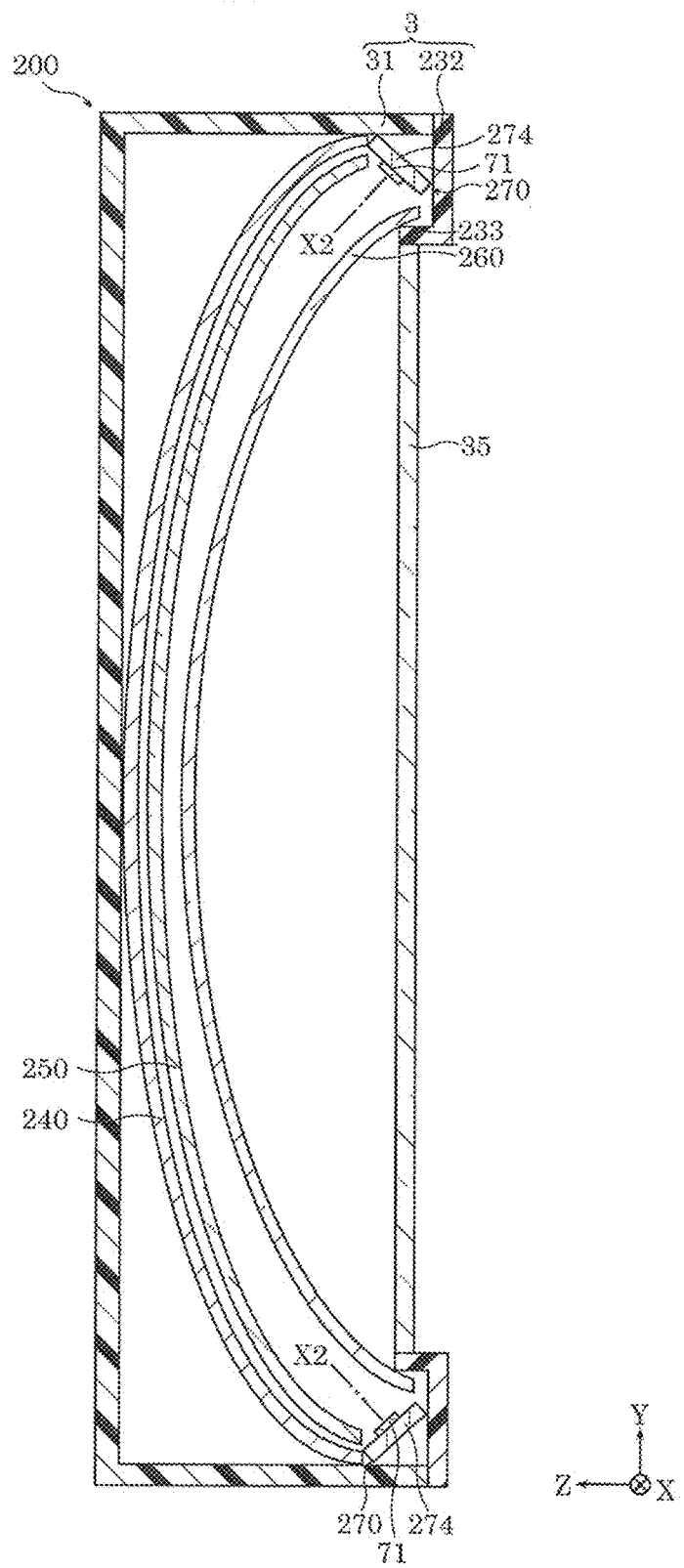
FIG. 6 is a cross-sectional diagram which illustrates the lighting apparatus according to Embodiment 2.
Figure 7:
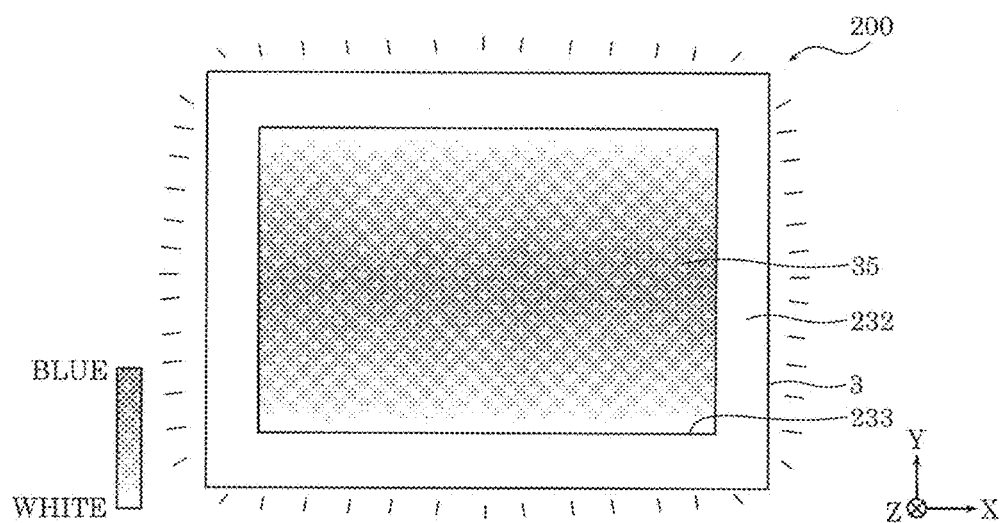
FIG. 7 is an image diagram which illustrates light distribution of the lighting apparatus according to Embodiment 2.

The following describes a configuration of lighting apparatus 200 according to Embodiment 2, with reference to FIG. 6 and FIG. 7.

FIG. 6 is a cross-sectional diagram which illustrates lighting apparatus 200 according to Embodiment 2. FIG. 7 is an image diagram which illustrates light distribution of lighting apparatus 200 according to Embodiment 2. It should be noted that, although white light source 71 is viewed due to the position of the cross-section surface in FIG. 6, blue light source 72 may be viewed in a different cross-section surface.

Embodiment 2 is different from Embodiment 1 in that light diffuser layer 250 and reflector layer 240 are curved symmetrically, and in that two light emitting modules 270 are used. Other structural components included in lighting apparatus 200 according to embodiment 2 are the same as those included in lighting apparatus 1 according to Embodiment 1 unless otherwise specified, and thus the same structural components are assigned with the same reference signs, and detailed descriptions for the structural components will be omitted.

In the present embodiment, the case where lighting apparatus 200 is installed on a ceiling is described. It should be noted that lighting apparatus 200 may be installed on a wall or the like, other than on the ceiling, and the usage of lighting apparatus 200 is not specifically limited.

As illustrated in FIG. 6, reflector layer 240 is disposed on a base portion of main body 31 in casing 3 of lighting apparatus 200. Reflector layer 240 has a symmetrical arc-like shape in a cross-section view, and is curved in such a manner that a center portion protrudes upwardly. Light diffuser layer 250 is disposed downwardly with respect to reflector layer 240. In the same manner as reflector layer 240, light diffuser layer 250 has a symmetrical arc-like shape in a cross-section view, and is curved in such a manner that a center portion protrudes upwardly. Although a gap is defined between reflector layer 240 and light diffuser layer 250 according to the present embodiment, reflector layer 240 and light diffuser layer 250 may be integrally formed as in the modification example of Embodiment 1.

Although reflector layer 240 and light, diffuser layer 250 each have a shape which defines a portion of a cylindrical shape according to the present embodiment, reflector layer 240 and light diffuser layer 250 may each have a shape which defines a portion of a centroclinal shape. In this case, in addition to the two light emitting modules 270 disposed on the front and back of the inside of main body 31, light emitting modules may be disposed on the back and front of the inside of main body 31. For example, the light emitting modules may be disposed on the right, left, hack, and front of light diffuser layer 250 and reflector layer 240 in such a manner that the light emitting modules surround scatter panel 260, light diffuser layer 250, and reflector layer 240. In this case, white light exits lighting apparatus 200 in proximity to the light emitting modules of lighting apparatus 200. The intensity of blue color gradually increases with increasing distance from white light source 71 and blue light source 72, and blue light exits lighting apparatus 200 in proximity to the center of lighting apparatus 200.

Scatter panel 260 is disposed downwardly with respect to reflector layer 240 and light diffuser layer 250. In the same manner as reflector layer 240 and light diffuser layer 250, scatter panel 260 has a symmetrical arc-like shape in a cross-section view, and is curved in such a manner that a center portion protrudes upwardly. Scatter panel 260 is spaced apart from the anterior surface of light diffuser layer 250. The center line orthogonal to scatter panel 260 in an anterior view substantially matches the center line orthogonal to light diffuser layer 250 in an anterior view. A gap between scatter panel 260 and light diffuser layer 250 gradually narrows in a direction of optical axis X2 of each of light emitting modules 270. According to the present embodiment, the gap is narrowest at the center line passing light diffuser layer 250 and scatter panel 260 in a cross-section view. It should be noted that, although scatter panel 260 is curved according to the present embodiment, scatter panel 260 may be flat.

The two light emitting modules 270 are disposed downwardly with respect to light diffuser layer 250 and scatter panel 260 between light diffuser layer 250 and scatter panel 260, and each have a plate-like shape elongated in the right and left direction. The two light emitting modules 270 are disposed on both of the first and second end sides of scatter panel 260, light diffuser layer 250, and reflector layer 240, in such a manner that scatter panel 260, light diffuser layer 250, and reflector layer 240 are interposed between the front and back sides. More specifically, one of the two light emitting modules 270 is disposed on the first end side of scatter panel 260, light diffuser layer 250, and reflector layer 240, and the other of the two light emitting modules 270 is disposed on the second end side of scatter panel 260, light diffuser layer 250, and reflector layer 240. In addition, the two light emitting modules 270 are disposed to emit light toward the gap between light diffuser layer 250 and scatter panel 260.

Light emitting modules 270 each include a plurality of white light sources 71, a plurality of blue light sources 72, and circuit board 274.

The plurality of white light sources 71 and the plurality of blue light sources 72 are each mounted on the respective circuit boards 274. The plurality of white light sources 71 and the plurality of blue light sources 72 may be aligned at substantially regular intervals along the length direction (right and left direction) of circuit board 274. The order of arrangement of the plurality of white light sources 71 and the plurality of blue light sources 72, and the number of lines may be changed as appropriate, and not limited to the examples of the embodiments.

Optical axis X2 of each the plurality of white light sources 71 and the plurality of blue light sources 72 is interposed between light diffuser layer 250 and scatter panel 260. In other words, the plurality of white light sources 71 and the plurality of blue light sources 72 emit light toward the gap between reflector layer 240 and scatter panel 260 and the gap between light diffuser layer 250 and scatter panel 260.

Frame body 232 is, for example, a flat component having a rectangular shape in an anterior view, and includes opening portion 233 in the center portion. Opening portion 233 according to the present embodiment corresponds to an inner portion of frame body 232, and defines a recess towards the upper side with respect to frame body 232. Frame body 232 is disposed downwardly with respect to main body 31 to cover a portion of the anterior side of main body 31, in such a manner that the both of light emitting modules 270 are not viewed even when viewed from an oblique direction. Opening portion 233 of frame body 233 is provided with light transmissive plate 35 to cover opening portion 233. It should be noted that frame body 232 may have a configuration similar to the configuration of Embodiment 1.

As illustrated in FIG. 7, according to lighting apparatus 200 described above, for example, when white light sources 71 and blue light sources 72 of light emitting module 270 are turned on, white light exits lighting apparatus. 200 in proximity to light emitting module 270, and blue light exits lighting apparatus 200 by gradually increasing the intensity of blue color with increasing distance from light emitting module 270. In addition, luminance level is also decreases with increasing distance from light, emitting module 270. In other words, bright white light is emitted in proximity to light emitting module 270, and dark blue light is emitted to a greater extent with increasing distance from light emitting module 270. Thus, light having a gradation in which white light gradually changes to blue light from the first end side or the second end side toward the center portion of scatter panel 260 exits scatter panel 260.

The present embodiment produces other advantageous effects in the same manner as Embodiment 1 and the like.

Embodiment 3

(Configuration)

Figure 8:
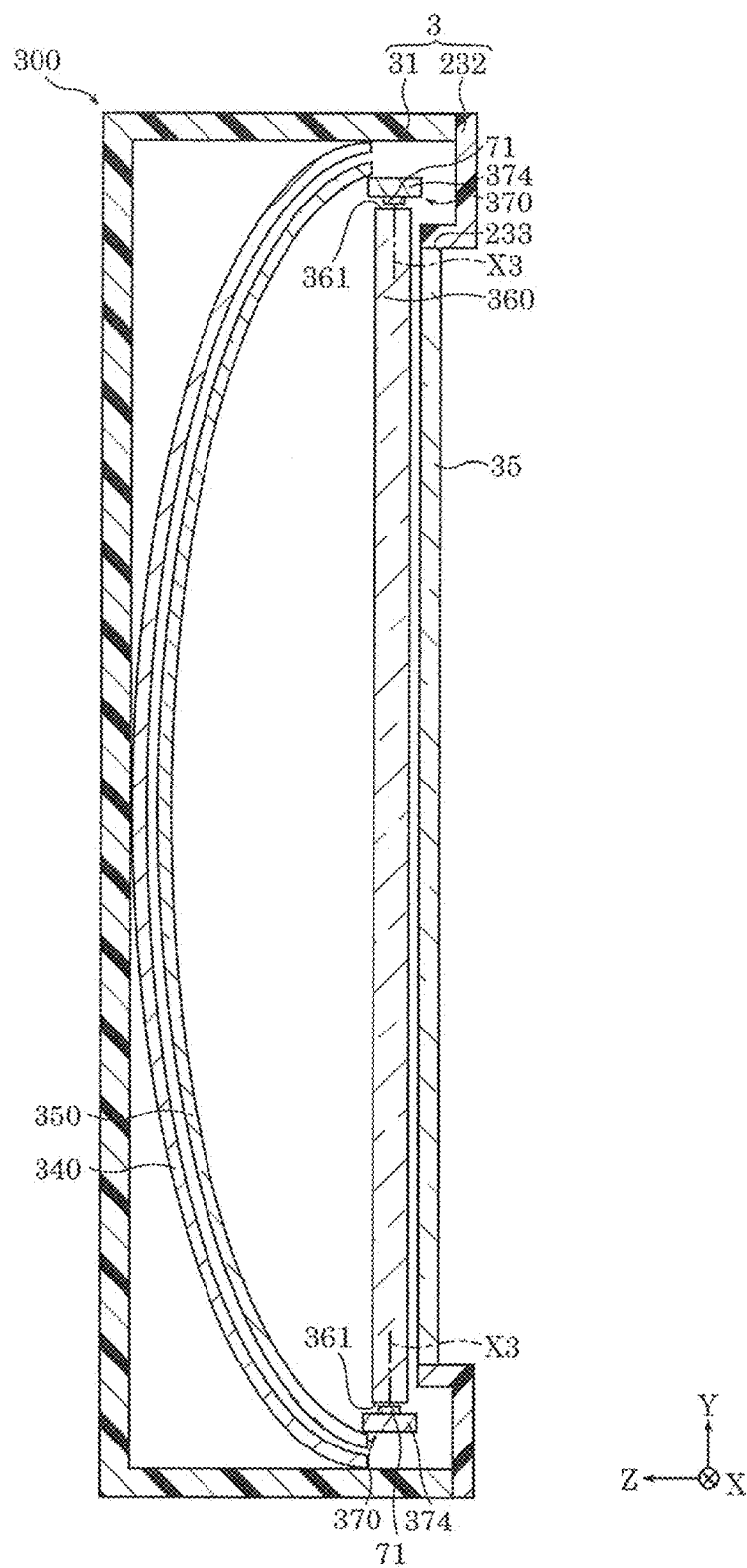
FIG. 8 is a cross-sectional diagram which illustrates the lighting apparatus according to Embodiment 3.
Figure 9:
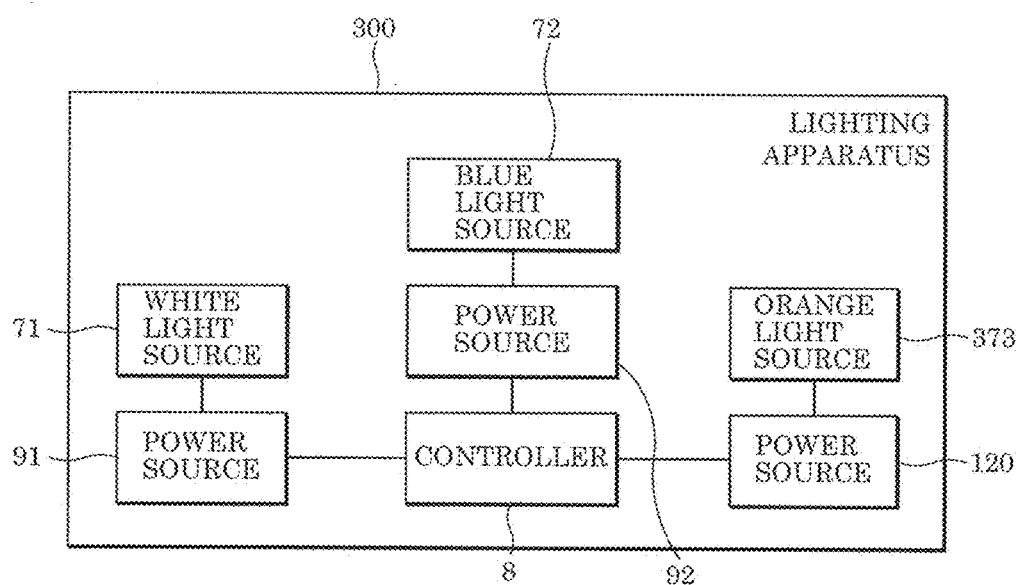
FIG. 9 is a block diagram which illustrates the lighting apparatus according to Embodiment 3.

The following describes a configuration of lighting apparatus 300 according to Embodiment 3, with reference to FIG. 8 and FIG. 9.

FIG. 8 is a cross-sectional diagram illustrating lighting apparatus 300 according to Embodiment 3. FIG. 9 is a block diagram which illustrates lighting apparatus 300 according to Embodiment 3. It should be noted that, although white light source 71 is viewed due to the position of the cross-section surface in FIG. 8, blue light source 72 may be viewed in a different cross-section surface.

The present embodiment is different from Embodiment 1 in that light emitted by light emitting module 370 is caused to enter scatter panel 360 from a side face of scatter panel 360. In addition, lighting apparatus 300 according to Embodiment 3 is the same as lighting apparatus 1 according to Embodiment 1 unless otherwise specified, and thus the same structural components are assigned with the same reference signs, and detailed descriptions for the structural components will be omitted.

As illustrated in FIG. 8 and FIG. 9, scatter panel 360 includes incident surface 361 in addition to an anterior surface and a rear surface. Incident surface 361 corresponds to each of the side faces of scatter panel 360, and light emitted by light emitting modules 370 enters the side faces of scatter panel 360.

Scatter panel 360 has a light scattering function that scatters light that scatter panel 360 guides. According to the present embodiment, as one example of scatter panel 360, a Rayleigh scattering plate which causes Rayleigh scattering of incident light is employed. The Rayleigh scatter panel is a component which includes resin such as light-transmissive acrylic as a base material, and a nanocomposite material dispersed therein. The nanocomposite material is oxidized metal such as titanium oxide, zinc oxide, zirconia oxide, etc. When a particle size of the nanocomposite material is sufficiently smaller than a wavelength of light, Rayleigh scattering of light which is incident on scatter panel 360 occurs. Scatter panel 360 may cause Rayleigh scattering of, at least, light having a wavelength in a range from at least 435 nm to at most 495 nm.

The two light emitting modules 370 emit light to scatter panel, and are disposed in such a manner that scatter panel 360 is interposed between the two light emitting modules. More specifically, one of the two light emitting modules 370 is disposed on one of the side faces of scatter panel 360, and the other of the two light emitting modules 370 is disposed on the other of the side faces of scatter panel 360. The one of the two light emitting modules 370 face the other of the two light emitting modules 370 with scatter panel 360 being interposed. In other words, in lighting apparatus 300 according to the present embodiment, an edge light system which causes light emitted by light emitting modules 370 to enter scatter panel 360 from the side faces on the front and back sides of scatter panel 360 is employed.

White light source 71, blue light source 72, and orange light source 373 (one example of the light source) are each disposed on circuit board 374 of each of light emitting modules 370. Light emitting modules 370 are each included in casing 3 in such a manner that optical axis X3 enters substantially perpendicular to incident surface 361 of scatter panel 360. More specifically, white light source 71, blue light source 72, and orange light source 373 of one of the two light emitting modules 370 are included in casing 3 in such a manner that optical axis X3 enters substantially perpendicular to one of incident surfaces 361 of scatter panel 360. In addition, white light source 71, blue light source 72, and orange light source 373 of the other of light emitting modules 370 are included in casing 3 in such a manner that optical axis X3 enters substantially perpendicular to the other of incident surfaces 361 of scatter panel 360. In other words, white light source 71, blue light source 72, and orange light source 373 each emit light toward scatter panel 360, reflector layer 340, and light diffuser layer 350. More specifically, white light source 71, blue light source 72, and orange light source 373 each emit light toward scatter panel 360, and emit light toward reflector layer 340 and light diffuser layer 350 via scatter panel 360.

White light source 71, blue light source 72, and orange light source 373 are each disposed to face incident surface 361 (side surface) of scatter panel 360, and disposed on circuit board 274 in such a manner that white light source 71, blue light source 72, and orange light source 373 are each spaced apart from scatter panel 360 to avoid contact to each of incident surfaces 361 of scatter panel 360. Optical axis X3 of each of white light source 71, blue light source 72, and orange light source 373 is substantially parallel to scatter panel 360, and substantially orthogonal to incident surface 361 of scatter panel 360. In addition, white light source 71, blue light source 72, and orange light source 373 may be in proximity to incident surface 361 of scatter panel 360 for enabling a large amount of light to enter incident surface of scatter panel 360.

Moreover, other than the two light emitting modules 370 disposed on the right and left of scatter panel 360, light emitting modules may be disposed on the back and front of scatter panel 360.0 For example, the light emitting modules may be disposed in such a manner that the light emitting modules surround scatter panel 360. In this case, white light exits lighting apparatus 300 in proximity to the light emitting modules. The intensity of blue color gradually increases with increasing distance from white light source 71 and blue light source 72, and blue light exits lighting apparatus 300 in proximity to the center of scatter panel 360.

Reflector layer 340 is disposed on a base portion of main body 31 in casing 3 of lighting apparatus 300. Reflector layer 340 has a symmetrical arc-like shape in a cross-section view, and is curved to protrude upwardly. Light diffuser layer 350 is disposed downwardly with respect to reflector layer 340. In the same manner as reflector layer 340, light diffuser layer 350 has a symmetrical arc-like shape in a cross-section view, and is curved to protrude upwardly. Although reflector layer 340 and light diffuser layer 350 each have a shape which defines a portion of a cylindrical shape according to the present embodiment, reflector layer 340 and light diffuser layer 350 may each have a shape which defines a portion of a centroclinal shape. Although a gap is defined between reflector layer 340 and light diffuser layer 350 according to the present embodiment, reflector layer 340 and light diffuser layer 350 may be integrally formed as in the modification example of Embodiment 1.

With such a lighting apparatus, light emitted by white light source 71, blue light source 72, and orange light source 373 enter scatter panel 360 from incident surface 361 of scatter panel 360, and is scattered when guided by scatter panel 360. A portion of the scattered light exits scatter panel 360 from the anterior surface of scatter panel 360, and another portion of the scattered light exits scatter panel 360 from the rear surface of scatter panel 360 and travels toward reflector layer 340 and light diffuser layer 350. More specifically, white light and blue light are scattered by scatter panel 360, exit scatter panel 360 from the rear surface of scatter panel 360, and travel toward reflector layer 340 and light diffuser layer 350. Then, a portion of the white light and blue light is diffused and reflected by light diffuser layer 350, and another portion is reflected by reflector layer 340 and exits scatter panel 360. Orange light is less scattered compared to white light and blue light, and is guided by scatter panel 360. Then, a portion of the orange light exits scatter panel 360 from the anterior surface of scatter panel 360.

With lighting apparatus 300 as described above, for example, the output of white light source 71 is set at approximately the middle level, and the output of blue light sources 72 is set at a level greater than approximately the middle level, by controller 8, in light emitting module 370. Furthermore, the output of orange light source 373 is set at zero, by controller 8, in light emitting module 370. In this case, bright white light exits scatter panel 360 from the side close to light emitting module 370, and blue light which gradually increases the brightness exits scatter panel 360 with increasing distance from light emitting module 370. In other words, light having a gradation that changes gradually from white light to blue light from a first end side and a second end side toward a center portion of scatter panel 360 exits scatter panel 360, and thus it looks as if the actual sky extends far away from light transmissive plate 35.

With lighting apparatus 300 as described above, for example, the output of white light source 71 is set at approximately the middle level, and the output of blue light sources 72 is set at a level less than approximately the middle level, in light emitting module 370. Furthermore, the output of orange light source 373 is set at zero in light emitting module 370. In this case, bright white light exits scatter panel 360 from the side close to light emitting module 370, and white light which gradually decreases in the brightness exits scatter panel 360 with increasing distance from light emitting module 370. In other words, light having a gradation that gradually decreases in the brightness (decreases in the luminance level) from the first end side and the second end side toward the center portion of scatter panel 360 exits scatter panel 360, and thus it looks as if the actual cloudy sky extends far away from light transmissive plate 35.

In addition, with lighting apparatus 300 as described above, for example, the output of orange light source 373 is set at approximately the middle level in light emitting module 370, and the output of each of white light source 71 and blue light source 72 is set at a level less than approximately the middle level in light emitting module 370. In this case, bright orange light exits scatter panel 360 from the side close to light emitting module 370, and blue light which gradually decreases in the brightness exits scatter panel 360 with increasing distance from light emitting module 370. In other words, light having a gradation that changes gradually from orange light to blue light and also gradually decreases in the brightness from the first end side and the second end side toward the center portion of scatter panel 360 exits scatter panel 360, and thus it looks as if the actual sunset extends far away from light transmissive plate 35.

In addition, with lighting apparatus 300 as described above, for example, the output of white light source 71 is set at zero or approximately zero, and the output of blue light sources 72 is set at a level less than approximately the middle level, in light emitting module 370. Furthermore, the output of orange light source 373 is set at zero or approximately zero in light emitting module 370. In this case, dark blue light exits scatter panel 360 from the side close to light emitting module 370, and light is less and less emitted with increasing distance from light emitting module 370. In other words, light having a gradation that gradually decreases in the brightness (decreases in the luminance level) from the first end side and the second end side toward the center portion of scatter panel 360 exits scatter panel 360, and thus it looks as if the state of night is presented and the actual evening state extends far away from light transmissive plate 35.

In this manner, it is possible to reproduce various states of the sky such as the blue sky, the cloudy sky, a sunset, an evening, and so on, by controlling white light source 71, blue light source 72, and orange light source 373 using lighting apparatus 300.

Advantageous Effect

Next, an advantageous effect of lighting apparatus 300 according to the present embodiment will be described.

As described above, in lighting apparatus 300 according to the present embodiment, the light source further includes orange light source 373 which emits orange light.

According to this configuration, it is possible to simulatively reproduce the state of sunset on scatter panel 360. In particular, it is possible to reproduce various states of the sky such as the blue sky, the cloudy sky, sunset, an evening, and so on, by combining white light source 71 and blue light source 72 with orange light source 373.

In addition, lighting apparatus 300 according to the present embodiment further includes controller 8 which reproduces the blue sky, the cloudy sky, a sunset, an evening, by controlling a light emission mode of the light sources.

The present embodiment produces other advantageous effects in the same manner as Embodiment 1 and the like.

Embodiment 4

(Configuration)

Figure 10:
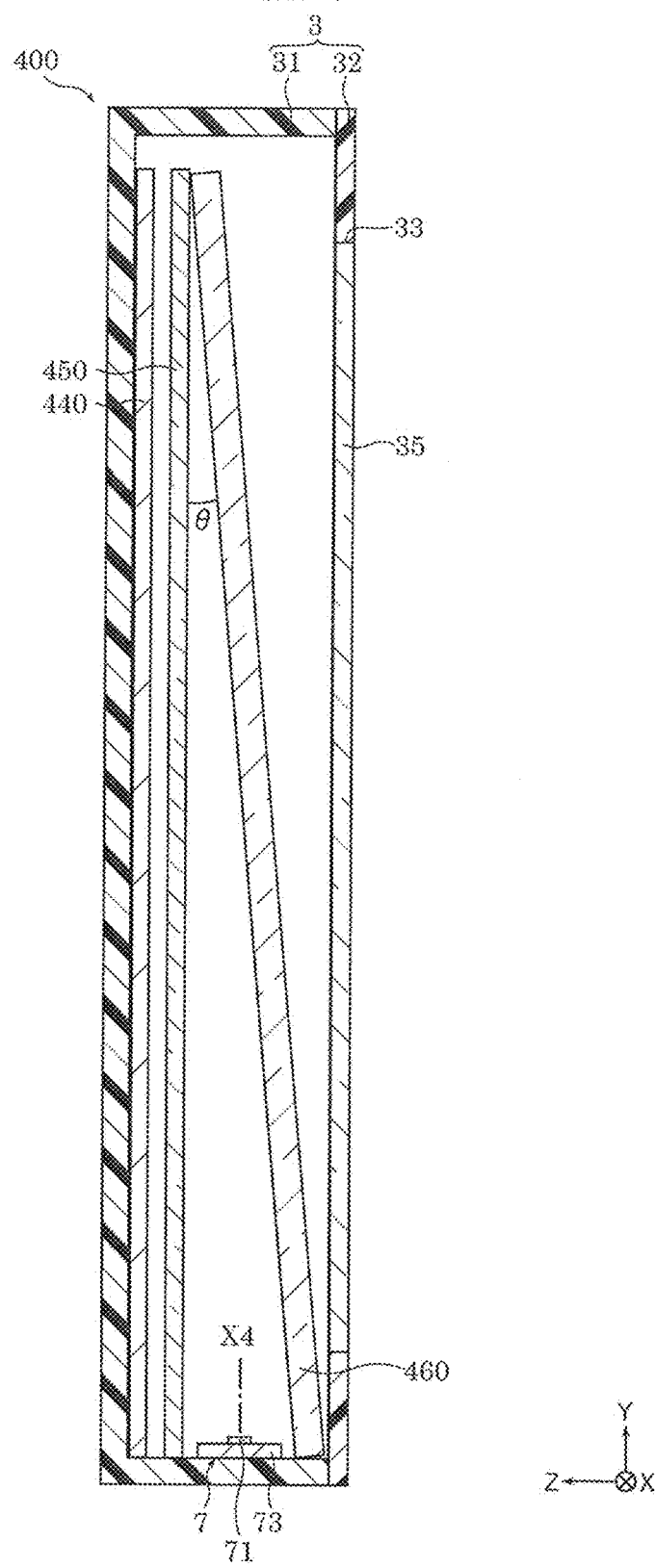
FIG. 10 is a cross-sectional diagram which illustrates the lighting apparatus according to Embodiment 4.

The following describes a configuration of lighting apparatus 400 according to Embodiment 4, with reference to FIG. 10.

FIG. 10 is a cross-sectional diagram which illustrates lighting apparatus 400 according to Embodiment 4. It should be noted that, although white light source 71 is viewed due to the position of the cross-section surface in FIG. 10, blue light source 72 may be viewed in a different cross-section surface.

The present embodiment differs from Embodiment 1 in that reflection layer 440 and light diffuser layer 450 are flat. In addition, lighting apparatus 400 according to Embodiment 4 is the same as lighting apparatus 1 according to Embodiment 1 unless otherwise specified, and thus the same structural components are assigned with the same reference signs, and detailed descriptions for the structural components will be omitted.

Light diffuser layer 450 is substantially parallel with reflector plate 440, and is substantially horizontally disposed on casing 3. Although gap W is defined between reflector layer 440 and light diffuser layer 450 according to the present embodiment reflector layer 440 and light diffuser layer 450 may be integrally formed as in the modification example of Embodiment 1.

Scatter panel 460 is disposed at a predetermined angle θ with respect to reflector plate 440 and light diffuser layer 450. A gap between scatter panel 460 and reflector layer 440 and a gap between scatter panel 460 and light diffuser layer 450 each gradually narrow from the first end side to the second end side. Here, the predetermined angle θ is in a range from at least 2 degrees to at most 10 degrees.

According to the present disclosure, the predetermined angle θ formed by scatter panel 460 and reflector layer 440 and light diffuser layer 450 is assumed to be 5 degrees. A gap for disposing light emitting module 7 is provided at the first end side of scatter panel 460, and the second end side of scatter panel 460 is in contact with an edge of the second end side of reflector plate 440 and light diffuser layer 450.

As described above, in lighting apparatus 400 according to the present embodiment, light diffuser layer 450 is flat. In addition, scatter panel 460 is flat. Scatter panel 460 is disposed at a predetermined angle with respect to reflector layer 440. The predetermined angle is in a range from at least 2 degrees to at most 10 degrees.

The present embodiment produces other advantageous effects in the same manner as Embodiment 1 and the like.

(Other Modification Examples, etc.)

Although the lighting apparatus according to the present disclosure has been described on the basis of Embodiments 1 to 4, and the modification examples of Embodiment 1, the present disclosure is not limited to the above-described Embodiments 1 to 4, and the modification examples of Embodiment 1.

For example, in the foregoing embodiments, the controller may have a timer function. In addition, the controller may have, for example, a lighting mode for switching between the blue sky, the sunset, the cloudy sky, the evening sky, and so on, at a predetermined time (when a predetermined period of time passes), using the timer function. More specifically, for example, switching may be carried out in the lighting mode such that, when a predetermined period of time passes after light for reproducing the artificial blue sky is emitted, light for reproducing the sunset sky is emitted and light for reproducing the evening sky or the like is emitted. In addition, the lighting apparatus may be automatically turned off when a predetermined period of time passes. In this case, lighting changes at a predetermined time according to the timer function and the lighting mode, and thus it is possible to implement the lighting environment as if there is a window. Such settings may be performed using an operation interface such as a remote controller, which is not illustrated.

In addition, although the lighting apparatus has a rectangular shape in an anterior view (when viewed from the lower side) in the foregoing embodiments, the shape is not limited to the rectangular shape. For example, a multiangular shape such as a triangular shape, or a half-moon shape may be employed, or a combination of these shapes may be employed.

In addition, in the foregoing embodiments, a diffusion cover (straight-tube LED lamp) which covers the light source may be provided. In this case, comparing to the case where light is emitted from a plurality of LED chips which are simply arranged, luminance unevenness and color unevenness are not likely to occur on the light diffuser layer in proximity to the light source.

In addition, in the foregoing embodiments, although an operation interface is electrically connected to the lighting apparatus, a remote controller which performs radio communications may operate the lighting apparatus (operation such as turning on or off of the power sources). The radio communications can be achieved by providing the lighting apparatus with a communicator which performs the radio communications with the remote controller. The communicator is, for example, a device having the near field communication function, such as ZigBee (registered trademark), Wi-Fi (registered trademark), and Bluetooth (registered trademark).

In addition, in the foregoing embodiments, the anterior surface of the light diffuser layer may be covered with an antireflection film for preventing reflection of light. Furthermore, the rear surface of the light transmissive plate may be covered with an antireflection film for preventing reflection of light. In this case, the rear surface of the light transmissive plate is covered with the antireflection film, and thus it is difficult for light which is incident on the rear surface of the light transmissive plate to be reflected and travel to the light diffuser layer. In addition, the anterior surface of the light diffuser layer is covered with the antireflection film, and thus it is difficult for light which is incident on the anterior surface of the light diffuser layer to be reflected and exit the lighting apparatus through the light transmissive plate.

It should be noted that the present disclosure also includes other forms in which various modifications apparent to those skilled in the art are applied to Embodiments 1 to 4, and the modification examples of Embodiment 1 or forms in which structural components and functions in Embodiments 1 to 4, and the modification examples of Embodiment 1 are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus, comprising:
   a light source;
   a reflector layer which reflects light;
   a light diffuser layer which is light transmissive and is disposed on an anterior surface side of the reflector layer; and
   a scatter panel which is light transmissive and is disposed on an anterior surface side of the light diffuser layer to face the light diffuser layer,
   wherein the light diffuser layer is disposed between the reflector layer and the scatter panel along an entire length of the light diffuser layer,
   a size of at least a portion of a gap between the scatter panel and the reflector layer and a size of at least a portion of a gap between the scatter panel and the light diffuser layer change from a first end side to a second end side of the lighting apparatus, and
   the light source is disposed on the first end side of the lighting apparatus to emit light toward the light diffuser layer and the scatter panel.

2. The lighting apparatus according to claim 1, wherein the gap between the scatter panel and the reflector layer and the gap between the scatter panel and the light diffuser layer narrow from the first end side to the second end side of the lighting apparatus.

3. The lighting apparatus according to claim 2, wherein an edge on the second end side of each of the light diffuser layer and the reflector layer is in contact with the scatter panel, the edge on the second end side being opposite to the light source.

4. The lighting apparatus according to claim 1, wherein the light diffuser layer is adjacent to and spaced from the reflector layer.

5. The lighting apparatus according to claim 1, wherein the light source emits light of different luminescent colors.

6. The lighting apparatus according to claim 5,
wherein the light source includes a white light source which emits white light and a blue light source which emits blue light.

7. The lighting apparatus according to claim 6,
wherein the light source further includes an orange light source which emits orange light.

8. The lighting apparatus according to claim 7, further comprising:
a casing which includes a frame body having a plate-like shape and including an opening portion through which light that exits the light diffuser layer passes,
wherein the light source is disposed on the casing such that light is caused to enter the scatter panel from a side face of the scatter panel, and
the scatter panel has a light scattering function that scatters light that is guided by the scatter panel.

9. The lighting apparatus according to claim 1, further comprising:
a frame body which has a plate-like shape and includes an opening portion through which light that exits the light diffuser layer passes,
wherein the frame body is disposed to cover an outer periphery of the light diffuser layer in an anterior view of the opening portion.

10. The lighting apparatus according to claim 1,
wherein the reflector layer is a mirror which reflects incident light.

11. The lighting apparatus according to claim 1, further comprising:
a wavelength absorbing layer which absorbs light having a predetermined wavelength.

12. The lighting apparatus according to claim 11,
wherein the wavelength absorbing layer is disposed on the reflector layer, and
the reflector layer has a wavelength-selective property which absorbs light having a wavelength in a range from at least 610 nm to at most 750 nm, and reflects light having a wavelength in a range from at least 435 nm to at most 495 nm.

13. The lighting apparatus according to claim 1,
wherein less than or equal to 50% of light reflected by the reflector layer is diffusely reflected.

14. The lighting apparatus according to claim 1,
wherein a haze of the scatter panel is in a range from approximately 5% to approximately 30%.

15. The lighting apparatus according to claim 1,
wherein the light diffuser layer is flat,
the scatter panel is flat and disposed at a predetermined angle with respect to the reflector layer, and
the predetermined angle is in a range from at least 2 degrees to at most 10 degrees.

16. The lighting apparatus according to claim 1,
wherein the scatter panel is a Rayleigh scattering plate which causes Rayleigh scattering of incident light.

17. The lighting apparatus according to claim 1, further comprising:
a controller which reproduces a blue sky, a cloudy sky, a sunset, and an evening, by controlling a light emission mode of the light source.

18. A lighting apparatus, comprising:
a light source;
a reflector layer which reflects light;
a light diffuser layer which is light transmissive and is disposed on an anterior surface side of the reflector layer; and
a scatter panel which is light transmissive and is disposed on an anterior surface side of the light diffuser layer to face the light diffuser layer,
wherein the light diffuser layer is disposed between the reflector layer and the scatter panel,
a size of at least a portion of a gap between the scatter panel and the reflector layer and a size of at least a portion of a gap between the scatter panel and the light diffuser layer change from a center portion to end portions of the lighting apparatus, and
the light source is disposed on the end portions of the lighting apparatus to emit light toward the light diffuser layer and the scatter panel.

19. The lighting apparatus according to claim 18,
wherein the gap between the scatter panel and the reflector layer and the gap between the scatter panel and the light diffuser layer narrow from the end portions to the center portion of the lighting apparatus.

20. The lighting apparatus according to claim 18,
wherein the gap between the scatter panel and the reflector layer and the gap between the scatter panel and the light diffuser layer narrow from the center portion to the end portions of the lighting apparatus.

* * * * *